United States Patent [19]

Sato

[11] 3,937,500
[45] Feb. 10, 1976

[54] DEVICE FOR CONNECTING TELESCOPING PIPES

[76] Inventor: Toshiyuki Sato, 174-banchi, 569 Osaka, Takatsuki, Nobori, Japan

[22] Filed: June 18, 1974

[21] Appl. No.: 480,486

[30] Foreign Application Priority Data
June 19, 1973 Japan............................. 48-73015

[52] U.S. Cl. ................ 285/323; 279/57; 285/364; 285/400; 285/414; 403/369
[51] Int. Cl.² ......................................... F16L 21/06
[58] Field of Search .......... 285/363, 368, 337, 323, 285/405, 412, 413, 414, 415, 400, 321; 403/369 X; 279/50, 57, 43

[56] References Cited
UNITED STATES PATENTS

| 944,877 | 12/1909 | Koschinski | 285/415 X |
| 1,016,620 | 2/1912 | Grapp | 285/415 X |
| 1,574,922 | 3/1926 | Nelson | 285/323 X |
| 2,438,234 | 3/1948 | Stewart | 285/363 X |
| 3,248,135 | 4/1966 | Meripol | 285/323 |
| 3,594,023 | 7/1971 | Yano | 285/337 |

Primary Examiner—Thomas F. Callaghan
Assistant Examiner—Moshe I. Cohen
Attorney, Agent, or Firm—Edwin E. Greigg

[57] ABSTRACT

An annular member to be fitted around a small-diameter pipe has drawing means and pressing members. The drawing means connect the annular member to a large-diameter pipe, and the pressing members to the small-diameter pipe to thereby connect the small-diameter pipe and the large-diameter pipe together.

3 Claims, 5 Drawing Figures

DEVICE FOR CONNECTING TELESCOPING PIPES

BACKGROUND OF THE INVENTION

The present invention relates to a device for fixedly interconnecting a large-diameter pipe and a small-diameter pipe communicating with each other with one end of the small-diameter pipe inserted in one end of the large-diameter pipe.

Various pipe connecting devices of this type have heretofore been known, of which those most widely used are so designed that an annular member fitted around a small-diameter pipe is fixedly connected to a large-diameter pipe by a plurality of bolts and nuts disposed in the axial direction of the pipes to be connected together, and a plurality of bolts positioned at right angles to the axial direction and screwed in the annular member are pressed against the outer peripheral surface of the small-diameter pipe from outside radially thereof to fixedly connect the annular member to the small-diameter pipe.

With such conventional construction, however, the annular member is connected and fixed to the small-diameter pipe merely by a plurality of bolts which are disposed around the small-diameter pipe in pressing contact with its outer peripheral surface. Thus the connection between the annular member and small-diameter pipe is low in strength, entailing the drawback that the two pipes are easily removable from each other when subjected to a relatively small force acting thereon to separate one from the other. Especially when a bend is positioned near the connection between two pipes, the fluid pressure within the pipe exerts on the connection a fairly great force which acts to separate one pipe from the other, so that the device of the conventional construction described is not reliable to use at such portion.

Further when two pipes are connected together or separated from each other, the annular member and large-diameter pipe must of course be connected together or separated from each other using bolts and nuts and, moreover, the annular member and small-diameter pipe must be connected together or separated from each other using additional bolts. The conventional device therefore has the drawback of necessitating a very troublesome procedure in connecting and disconnecting two pipes.

SUMMARY OF THE INVENTION

The present invention intendes to overcome the conventional drawbacks described above and to provide a pipe connecting device which is capable of connecting large and small pipes together effectively and reliably and by which the pipes can be connected and disconnected readily and easily.

The pipe connecting device according to this invention comprises a plurality of drawing means each having an engaging portion engageable with an outer peripheral projection on the large-diameter pipe, an annular member holding the drawing means and fittable around the small-diameter pipe, a plurality of pressing members interposed between the inner surface of the annular member and the outer surface of the small-diameter pipe and each having a wedge projection, and a retaining member for preventing removal of the pressing members from the annular member when the device is not in use, at least one of the inner peripheral surfaces of the annular member and the outer peripheral surface of each of the pressing members being in the form of a slanting surface for causing the pressing member to move toward the outer peripheral surface of the small-diameter pipe and to thereby force the wedge projection against the outer peripheral surface of the small-diameter pipe by the movement of the annular member toward the large-diameter pipe when the annular member is drawn toward the large-diameter pipe by the drawing means, the retaining member permitting relative movement between the annular member and the pressing members when the annular member is drawn toward the large-diameter pipe when the device is put to use.

When the drawing means are tightened up to draw the annular member toward the large-diameter pipe to thereby fixedly connect them together, the slanting surface causes the pressing members to move toward the outer peripheral surface of the small-diameter pipe, forcing the wedge projections of the pressing members into the outer surface of the small-diameter pipe, whereby the annular member and the small-diameter pipe are firmly fixed together. Thus the large and small pipes can be fixedly connected together simply by tightening up the drawing means, whereas the pipes can be separated from each other by loosening the drawing means. In this way, the pipes can be easily connected and disconnected with very slight effort.

Furthermore, even if the connection between the two pipes which are fixed togther should be subjected to a force acting to separate them from each other, the pressing members wedged into the small-diameter pipe tend to move with the small-diameter pipe, with the result that the slanting surface forces the pressing members progressively into the small-diameter pipe. Thus the force acting to disconnect the pipes is reversely utilized to assure the connection between the small-diameter pipe and annular member, so that the higher the force to separate the pipes, the higher the strength of the connection between the small-diameter pipe and the annular member. It is therefore possible to fixedly connect the large and small pipes firmly and reliably.

Although the two pipes can be connected together firmly by providing a plurality of pressing members to cause their wedge projections to be forced into the peripheral surface of the small-diameter pipe, the pressing members might possibly be removed from the annular member and lost when the device is not in use or the device itself may become more troublesome to handle, but such objections are ingeniously obviated by the present invention with the use of the retaining member which prevents removal of the pressing members from the annular member when the device is not in use. When the device is put to use, the retaining member permits relative movement between the annular member and the pressing members, allowing the pressing members to be wedged into the inner surface of the small-diameter pipe as desired when the annular member is drawn toward the large-diameter pipe. Thus the provision of the retaining member in no way adversely affects the connection between the two pipes.

An object of this invention is to provide a device which is capable of connecting large and small pipes together firmly and which is easy to handle in connecting and disconnecting the pipes.

Another object of this invention is to provide a device which is capable of connecting large and small pipes effectively although it is simple in construction.

Still another object of this invention is to provide a device which is simple and easy to manufacture.

Other objects and advantages of this invention will become apparent from the following description.

DESCRIPTION OF THE PREFERRED EMBODIMENTS

Figure 1:
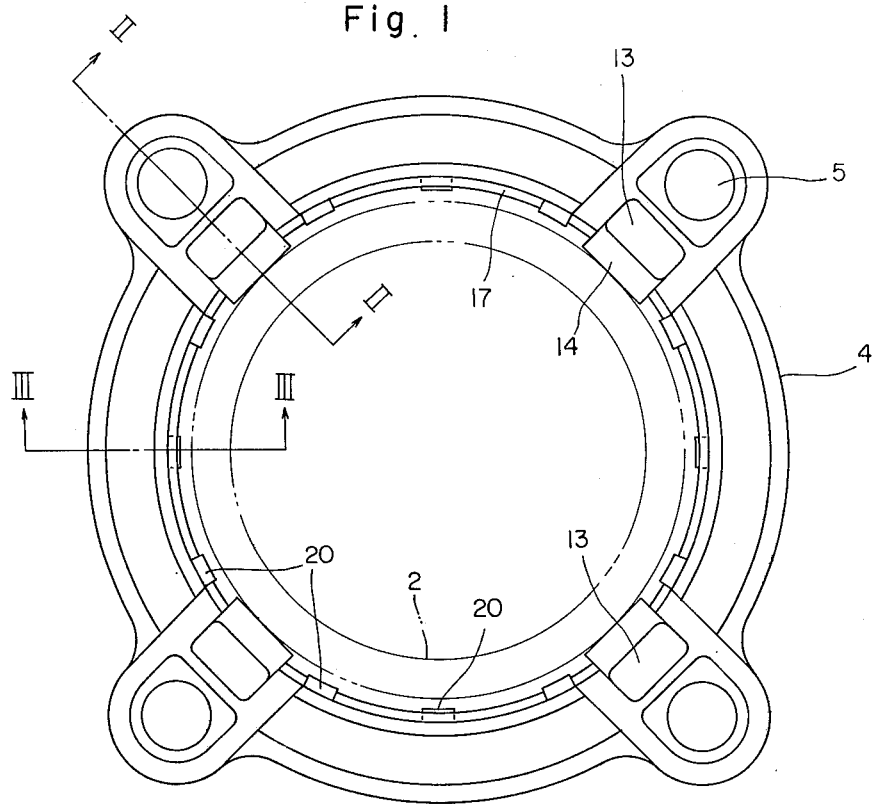
FIG. 1 is a front view of a pipe connecting device according to this invention.
Figure 2:
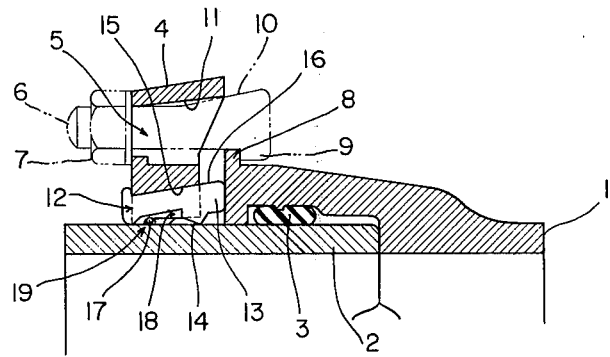
FIG. 2 is a view in section taken along the line II—II in FIG. 1.

With reference to the preferred embodiments, the mode of practicing this invention will be described below. FIGS. 1 and 2 show a large-diameter pipe 1 for transporting various liquids and gases and a small-diameter pipe 2 inserted in and connected to one end of the large-diameter pipe 1. An annular sealing member 3 is interposed between the large and small pipes 1 and 2. The large-diameter pipe 1 has an enlarged diameter only at its one end for receiving the small-diameter pipe 2 as seen in FIG. 2, or may have a large diameter over the entire length thereof.

An annular member 4 made of cast iron has along its periphery four portions formed with holding bores 5 by which drawing means comprising bolts 6 and nuts 7 are supported on the annular member 4. Each of the bolts 6 is integrally formed at one end with an engaging portion 9 engageable with a projection 8 on the outer periphery of the large-diameter pipe 1, and has a slanting side surface 10, while the outer surface defining the holding bore 5 is in the form of a slanting surface 11 which is inclined in the same direction as the slanting surface 10 of the bolt 6, the slanting surfaces 10 and 11 being slidable relative to each other. Accordingly, when the nut 7 is tightened up to draw the annular member 4 toward the large-diameter pipe 1, the engaging portion 9 at the end of the bolt 6 engages with and is forced onto the outer peripheral projection 8 on the large-diameter pipe 1.

Formed at four portions in the inner peripheral surface of the annular member 4 are recesses 12 in each of which a pressing member 13 is inserted. The pressing member 13 is made of cast iron and is integrally formed, on its inner side surface, with a wedge projection 14. The tip of the wedge projection 14 is treated by high-frequency quenching and therefore has higher hardness than the small-diameter pipe 2. Slanting surfaces 15 and 16 inclined in the same direction are provided as the inner peripheral surface of the recess 12 of the annular member 4 and as the outer surface of the pressing member 13 respectively, the construction being such that when the nut 7 is tightened up to draw the annular member 4 toward the large-diameter pipe 1, the slanting surfaces 15 and 16 cause the pressing member 13 to move toward the outer peripheral surface of the small-diameter pipe 2, whereupon the wedge projection 14 is caused to be wedged into the outer peripheral surface of the small-diameter pipe 2.

Figure 4:
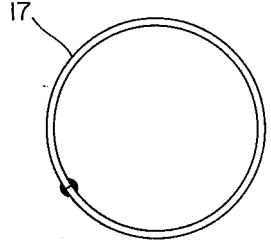
FIG. 4 is a front view showing a retaining member of the device.

A retaining member 17 serves to prevent the removal of the pressing members 13 from the annular member 4 when the device is not in use. As seen in FIG. 4, the retaining member 17 is made of a wire bent to a circular shape and has opposite ends welded together. The annular retaining member 17 is arranged to be held in the wide grooves 18 formed in the inner surfaces of the pressing members 13 and narrow grooves 19 formed in the inner surface of the annular member 4.

Figure 3:
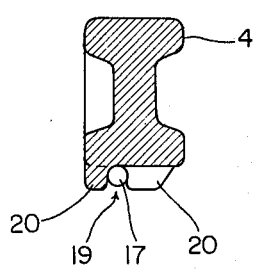
FIG. 3 is a view in section taken along the line III—III in FIG. 1.

To describe in greater detail, each of the grooves 19 in the annular member 4 is defined by projections 20 provided on the opposite sides of the position where the retaining member 17 is to be inserted as seen in FIGS. 1 and 3. The projections 20 are also formed integrally with the annular member 4 by casting. The groove 18 in each pressing member 13 has a suitable width in the axial direction of the large and small pipes 1 and 2 to be connected together. The wire serving as the retaining member 17 is first inserted into the grooves 18 and 19, and the opposite ends of the wire are then welded together, whereby the retaining member 17 made of the wire is fitted and held in the wide and narrow grooves 18 and 19. The wide grooves 18 in the pressing members 13 permit relative movement between the annular member 4 and pressing members 13 as the annular member 4 is drawn toward the large-diameter pipe 1 when the device is put to use.

The operation of present device will now be described. When the small-diameter pipe 2 is to be connected to the large-diameter pipe 1, the annular member 4 is first fitted around the small-diameter pipe 2. Since the pressing members 13 are held to the annular member 4 by the retaining member 17, the annular member 4 can be mounted in place with ease. Thus there is no need to manually insert the pressing members 13 into the recessess 12 in the annular member 4 and to manually hold the members 13 in this position state when mounting the annular member 4 on the small-diameter pipe 2. The mounting procedure can be followed easily, therefore. Furthermore when the device itself is transported, inadvertent removal of the pressing members 13 from the annular member 4 can be avoided, thus assuring easy handling.

The small-diameter pipe 2 with the annular member 4 thus fitted therearound is then inserted into the large-diameter pipe by suitable means. The engaging portions 9 at the ends of the bolts 6 are thereafter engaged with the outer peripheral projection 8 on the large-diameter pipe 1, and the nuts 7 are tightened up, causing the annular member 4 to be drawn toward the large-diameter pipe 1. At first during this process, the pressing members 13 are drawn together with the annular member 4. However, when the pressing members 13 are on longer capable of being drawn due to the contact of one end of each pressing member 13 with the end of the large-diameter pipe 1, the annular member 4 alone is thereafter advanced toward the large-diameter pipe 1. This movement causes the complementally contoured surfaces 15 and 16 to force the pressing members 13 to move toward the outer peripheral surface of the small-diameter pipe 2. Consequently, the wedge projections 14 on the pressing members 13 are forced into the outer surface of the small-diameter pipe 2, while the complementally formed surfaces 10 and 11 of the holding bores 5 and of the bolts 6 force the engaging portions 9 of the bolts 6 onto the outer peripheral projection 8 on the large-diameter pipe 2.

In this way, the annular member 4 is firmly connected to the small-diameter pipe 2 as well as to the large-diameter pipe 1. Even if the connection between the two pipes 1 and 2 thus connected is subjected to a force which acts to separate the pipes from each other, the pressing members 13 firmly wedge into the small-diameter pipe 2 and tend to move with the small-diameter pipe 2, with the result that the contacting surfaces 15 and 16 force the pressing members 13 further into the small-diameter pipe 2, thereby strengthening the connection between the pipes 1 and 2. The small pipe 2 can be readily separated from the large pipe 1 simply by loosening the nuts 7.

Although the illustrated embodiment has the complemental surfaces 15 and 16 formed respectively on the inner peripheral side of the annular member 4 and on the outer peripheral side of each pressing member 13 to force the wedge projection 14 into the outer surface of the small pipe effectively when the annular member 4 is drawn, the present invention can be practiced by providing the slanting surface only on one of the members. The annular member 4 and pressing members 13 need not necessarily be made of cast iron, but if the annular member is made of cast iron with a number of projections 20 defining the grooves 19 in the annular member 4 as in the foregoing embodiment, the member can be made by casting with a reduced number of crosses or the subsequent step of forming the grooves 19 by cutting can be eliminated. The device therefore has the advantage of being easy to manufacture.

It is further possible to position the pressing members 13 simply on the inner side of the annular member 4 instead of forming the recesses 12 in the inner surface of the annular member 4 for receiving the pressing members 13. However, if the pressing members 13 are inserted in the recesses 12 in the inner surface of the annular member 4 as in the embodiment described, the substantially circular retaining member 17 is employable which is easy to make. The retaining member 17 need not necessarily be in the form of an endless ring but may alternatively be in the form of a split ring. A shear pin is also usable. Most preferably, the pipes 1 and 2 to be connected together are made of cast iron, but the present device is also applicable to pipes made of any other material.

Figure 5:
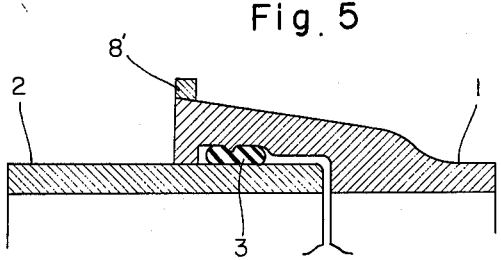
FIG. 5 is a view in section showing a modified example of the pipe to be connected.

FIG. 5 shows a modified example of the large-diameter pipe 1 to be connected which does not have the outer peripheral projection 8 formed integrally therewith. When the present device is used for such large-diameter pipe 1, a separate annular projection 8' corresponding to the foregoing outer peripheral projection 8 may be fitted around or secured to the large-diameter pipe 1. Thus according to this invention the outer peripheral projection 8 need not necessarily be formed integrally with the large-diameter pipe 1.

What we claim is:

1. A device for interconnecting a large-diameter pipe and a small-diameter pipe inserted in one end thereof comprising a plurality of drawing means each having an engaging portion engageable with an outer peripheral projection on the large-diameter pipe, an annular member holding the drawing means and fittable around the small-diameter pipe, a plurality of pressing members interposed between the inner surface of the annular member and the outer surface of the small-diameter pipe and each having a wedge projection, said pressing members being inserted in recesses formed in the inner surface of said annular member, and a substantially circular ring-like retaining member for preventing removal of the pressing members from the annular member when the device is not in use, said circular ring being fitted in grooves formed in the inner surface of the pressing members and in grooves formed in the inner surface of the circular member, at least one of the inner peripheral surfaces of the annular member and the outer peripheral surface of each of the pressing members being in the form of a slanting surface for causing the pressing member to move toward the outer peripheral surface of the small-diameter pipe and to thereby force the wedge projection against the outer peripheral surface of the small-diameter pipe by the movement of the annular member toward the large-diameter pipe when the annular member is drawn toward the large-diameter pipe by the drawing means, said grooves and the retaining member being dimensioned to permit relative movement between the annular member and the pressing members when the annular member is drawn toward the large-diameter pipe when the device is put to use.

2. The device as set forth in claim 1 wherein the pressing members and the annular member are made of cast iron, the tip of the pressing member being harder than the rest of said member and the groove in the annular member for receiving the ring is defined by a plurality of projections provided on the opposite sides of the position where the ring is inserted.

3. The device as set forth in claim 2 wherein both the inner peripheral surface of the annular member and the outer peripheral surface of each of the pressing members are in the form of the slanting surface, both the slanting surfaces being inclined in the same direction, each of the drawing means comprises a bolt and a nut, and the engaging portion is formed at the end of the bolt, the bolt being inserted in a holding bore formed in the annular member, the holding bore thus retaining the drawing means on the annular member, the outer surface defining the holding bore and the side surface of the bolt being inclined in the same direction to provide slanting surfaces which are slidable relative to each other so that the engaging portion at the end of the bolt is engageable with the outer peripheral projection on the large-diameter pipe when the annular member is drawn toward the large-diameter pipe by the drawing means.

* * * * *